Patented Dec. 18, 1951

2,579,033

UNITED STATES PATENT OFFICE 2,579,033

POLYMERIC POLYAMINE SALT COMPOSITIONS

Martin E. Cupery, Wilmington, Del., assignor to E. I. du Pont de Nemours & Company, Wilmington, Del., a corporation of Delaware No Drawing. Application September 7, 1948, Serial No. 48,161

10 Claims. (Cl. 260—29.4)

This invention relates to new compositions of matter and to methods for their preparation. More particularly this invention relates to salts of polymeric polyamines which are derived from monoolefin/carbon monoxide polymers and to methods for their preparation.

It is an object of this invention to provide new and useful salts of polymeric polyamines and methods for their preparation. A further object is to provide salts of polymeric polyamines derived from monoolefin/carbon monoxide polymers. A still further object is to provide salts of polymeric polyamines derived from ethylene/carbon monoxide polymers. Another object is to provide salts of polymeric polyamines derived from ethylene/carbon monoxide polymers which are readily soluble in organic solvents. An additional object is to provide salts of polymeric polyamines derived from ethylene/carbon monoxide polymers which impart water-repellency to textile materials.

The objects of this invention are accomplished by providing new polymeric salts of polymeric polyamines obtained by the reductive amination of monoolefin/carbon monoxide polymers.

The polymeric polyamines are obtained by the reductive amination of monoolefin/carbon monoxide polymers as described in the co-pending application of H. H. Hoehn, Serial No. 4,932, filed January 28, 1948, now Patent No. 2,445,255, issued January 24, 1950. In the preferred embodiment of this invention, the polymeric polyamine is the reaction product of the reductive amination of an ethylene/carbon monoxide copolymer.

The present application is a continuation-in-part of my application Serial No. 18,709, filed April 2, 1948, now Patent No. 2,526,637.

The new polymeric polyamine salts of this invention are made by reacting the polymeric polyamine with an acid which can be either an organic acid or an inorganic acid. Of the organic acids, the preferred are the monocarboxylic acids, particularly the aliphatic monocarboxylic acids, such as the saturated alkanoic acids containing from 1 to 17 carbon atoms in the alkane group, of which acetic acid is the most preferred. However, any acid can be used including acid dyestuffs.

The salts with inorganic or organic acids are conveniently made by adding the acid with stirring to a melt of the polymeric polyamine. Another method is to dissolve the polymeric polyamine in an organic solvent, such as a hydrocarbon solvent, and subsequently to add the acid to the solution with stirring. Still another method is to suspend the polymeric polyamine in a suitable medium and add the acid with stirring to the suspension.

When employing the last two alternative methods described above, the polymeric polyamine salt is isolated by removing the solvent or suspending medium, preferably under reduced pressure. The salt may be freed of any excess acid present by distillation, if the acid is volatile, or by any other method known to those skilled in the art.

Since acid dyestuffs are usually in the form of sodium salts, polymeric polyamine salts thereof are prepared by salt interchange between the acid dyestuff and a salt of the polymeric polyamine with an acid. This is conveniently done by dissolving the polymeric polyamine in dilute aqueous acid, e. g., dilute aqueous acetic acid, and adding said solution to a solution of the dye in water. The salt formed is separated by filtration, washed free of inorganic salt, and dried. If the acid dyestuff salt does not settle rapidly, coagulation may be brought about by a short heat-treatment.

The solubility in organic solvents of salts of polymeric polyamines with acid dyestuffs is dependent upon the nitrogen content of the polymeric polyamine employed in their preparation. In general, salts with acid dyestuffs prepared from polymeric polyamines high in nitrogen content are difficulty soluble in organic solvents. If it is desired therefore to prepare such salts having organic solvent solubility, it is necessary to employ polymeric polyamines having a C/N ratio of from 40:1 to 100:1. These polymeric polyamines have neutralization equivalents in the range of 700 to 1500. As the neutralization equivalent drops below 700, solubility of these salts in organic solvents decreases. These organic solvent-insoluble acid dyestuffs salts are useful as pigments.

In the preparation of the salts of this invention, it is most convenient to employ solutions of the polymeric polyamine. Suitable solvents are aromatic and aliphatic hydrocarbons, such as benzene, toluene, xylene, isooctane, and the like. Solutions containing up to the limit of solubility of the polymeric polyamine at ordinary temperatures can be used. For practical reasons, solutions containing from 2 to 50% solids are generally used.

In the preparation of the salts with inorganic acids and with organic acids the amount of acid employed in at least that required to provide an equivalent per amine group in the polymer. The amount is determined from the neutral equivalent of the polymeric polyamine. With volatile acids the use of excess acid, over the theoretically required amount, is not critical since the excess may subsequently be removed by distillation. With non-volatile acids, the theoretical amount is preferably used, if a neutral salt is desired. If an acid salt is desired, the theoretical amount of a polybasic acid is used to produce such salt.

In the case of the salts with acid dyestuffs, the amount of polymeric polyamine used is not critical since the salts are prepared by titrating the amine against the dye and the end point is taken as the point at which the dye is completely precipitated from solution in the form of the polyamine salt.

Organic acid salts of polymeric polyamines having molecular weights above 1000 are especially valuable because they impart to textile materials a practical degree of water-repellency. The solubility of these salts in water and in organic solvents decreases with increasing molecular weight of the polymeric polyamine. The molecular weight range 1000 to 2000 includes the polymeric polyamines having the best balance of solubility and usefulness as textile treating agents. This is therefore a preferred group of salts.

The examples which follow are submitted to illustrate and not to limit this invention. Unless otherwise stated parts are by weight. The saponification values given are determined by treating the salts with an amount of standard alkali in excess of that required to liberate the polyamine and then back titrating the excess alkali with acid.

*Example I*

To 100 parts of a 25% benzene solution of a polymeric polyamine having a neutral equivalent of 525 there was added 6 parts of glacial acetic acid with stirring. The resulting solution was then subjected to distillation to remove the benzene and excess acetic acid. There was obtained 30 parts of a tacky, wax-like polyamine salt having a saponification equivalent of 510. This product was soluble in water and by analysis had 2.61% nitrogen. The calculated value for the acetate of an amine with a neutral equivalent of 525 is 2.39%.

The polymeric polyamine used in the above experiment was prepared as follows:

A stainless steel-lined pressure reactor was charged with 400 parts of an ethylene/carbon monoxide polymer having a molecular weight of 1480 and an ethylene/carbon monoxide mole ratio of 10.4:1, 400 parts of benzene and 40 parts of a nickel-on-kieselguhr catalyst. The vessel was then closed, evacuated and charged with 100 parts of anhydrous ammonia. The reactor was placed in a shaker machine, and connected to a source of high pressure hydrogen. Hydrogen was expanded into the reactor, and heating and agitation were started. The temperature was raised to 200° C., and the pressure was adjusted to 260 atmospheres. These conditions were maintained for 15 hours. The reactor was then allowed to cool, excess hydrogen and ammonia were bled off, and the mixture of solvent, polymeric polyamine, and catalyst was discharged from the reactor. The reaction mixture was diluted with benzene and filtered to remove the catalyst. Analysis of the solution showed it to contain 25% solids by weight. The product had a neutral equivalent of 525, and contained 82.15% carbon, 13.92% hydrogen, 3.12% nitrogen (Dumas method) and 2.61% nitrogen (Van Slyke method).

*Example II*

Five and two tenths parts (0.01 mole) of the polymeric polyamine prepared as described in Example I was heated on a steam bath until molten. To the melt there was then added 0.6 part (0.01 mole) of glacial acetic acid with stirring. The polyamine salt obtained was a tacky, wax-like solid which was soluble in water.

*Example III*

Example I was duplicated, except that 5.7 parts of formic acid were used in place of the acetic acid. The salt obtained had a saponification equivalent of 431.2 and by analysis had 2.50% nitrogen. The calculated value is 2.45% nitrogen.

*Example IV*

Example I was duplicated, except that 5.7 parts of lactic acid was used in place of the acetic acid. The product obtained had a saponification equivalent of 680, and by analysis had 2.64% nitrogen. The calculated value is 2.28% nitrogen.

*Example V*

Twenty parts of a polymeric polyamine having a neutral equivalent of 594, prepared as described in Example I, was dissolved in 100 parts of benzene by warming to 50° C. To the solution there was added with stirring a solution of 2 parts of glacial acetic acid in 25 parts of benzene. The resulting salt was isolated by evaporation of the benzene under vacuum. The product obtained was a wax-like solid, which was soluble in water. The solubility of the product in water was unaffected by standing in air for six weeks.

Five parts of the acetate salt, prepared as described above, was dissolved in 92 parts of 1% aqueous acetic acid by heating and stirring. The solution was allowed to cool, and to the cold solution there was added 3 parts of 37% aqueous formaldehyde solution. A 7" by 7" sample of unbleached light weight wool flannel was impregnated with this solution to give about 10% polymer on the fabric, based on the dry weight of the sample. After baking at 100° C. for 15 minutes, the sample had excellent color and showed no relaxation shrinkage. After a 15 minute handmilling at 45° to 50° C. in 0.25% aqueous soap solution containing 0.1% sodium carbonate, the fabric showed only a 2% total shrinkage.

*Example VI*

One hundred parts of a 25% solution of a polymeric polyamine in water-saturated benzene was treated with carbon dioxide for 3 hours. The polyamine had a neutral equivalent of 420 and was prepared by the reductive amination of an ethylene/carbon monoxide polymer having an ethylene:carbon monoxide mole ratio of 7.8:1 as described in the co-pending application of H. H. Hoehn, Serial No. 4,932, filed January 28, 1948. The benzene was decanted from the coagulated gel which formed, and residual benzene was removed from the gel in vacuum at room temperature. The carbonate salt that formed was recovered as a slightly tacky, rubbery solid, which was insoluble in water and benzene, and was soluble, with loss of carbon dioxide, in 5% acetic acid and in hot benzene. By analysis the product contained 3.53% carbon dioxide.

*Example VII*

A composition was prepared by grinding the following mixture in a ball mill for 24 hours:

| | Parts |
|---|---|
| Titanium oxide pigment | 28 |
| Asbestine | 112 |
| High viscosity methyl cellulose (4000 cps.) | 2 |
| Copper phthalocyanine blue pigment | 0.2 |
| Water | 58 |
| 10% solution in 1.5% acetic acid of polymeric polyamine having a neutralization equivalent of 562 and prepared by reductively aminating an ethylene/carbon monoxide polymer of 9:1 mole ratio and of 1140 molecular weight | 200 |
| Total | 400.2 |

The resulting composition was applied by brushing to wallboard panels. It was found to have good brushing characteristics. After air-drying for 25 hours, the coating was found to be resistant to washing and to be color-fast after exposure for 20 hours to the fadeometer.

*Example VIII*

A composition was prepared by grinding the following for 24 hours in a ball mill:

| | Parts |
|---|---|
| Cadmium sulfide yellow pigment | 20 |
| 8% solution in 8% acetic acid of a polymeric polyamine having a neutral equivalent of 412, prepared by the reductive amination of an ethylene/carbon monoxide polymer of 7.5:1 mole ratio and of 1400 molecular weight | 50 |
| Total | 70 |

The above composition was applied to glassware, allowed to air-dry, and was then baked for 30 minutes at 105° C. The coating showed good adhesion to the glass and was unaffected by soaking for 2.5 days in acetone, toluene or 2% aqueous sodium hydroxide.

To 40 parts of the composition prepared as described above there was added 1 part of 33% aqueous formaldehyde. The resulting composition was applied to glass-ware, the coating was allowed to air-dry, and was then baked for 30 minutes at 105° C. The coating had good adhesion to glass and was resistant to water, acetone, and 2% aqueous sodium hydroxide, being unaffected by soaking in these media for 2.5 days.

*Example IX*

A composition for coloring textiles was prepared by ball-milling the following ingredients overnight:

| | Parts |
|---|---|
| Blue copper phthalocyanine pigment | 5.00 |
| 33% aqueous formaldehyde | 0.5 |
| Water | 45.5 |
| 10% solution in 10% acetic acid of the polymeric polyamine of Example VIII | 50.0 |
| Total | 101.0 |

The above composition was padded on to bleached muslin, allowed to air-dry, and the treated fabric was then baked for 5 minutes at 150° C. The resulting product was fast to washing in aqueous soap solutions.

*Example X*

A 0.5% aqueous solution of the sodium salt of benzene-azo-beta-naphthol - 6,8 - disulfonic acid, was prepared. Twenty-five parts of this solution was treated with 7 parts of a 10% solution, in 1% aqueous acetic acid, of a polymeric polyamine having a neutralization equivalent >1000, prepared by the reductive amination of an ethylene/carbon monoxide polymer of 5.5:1 mole ratio and of 1530 molecular weight. The precipitate which formed was filtered, washed and dried. The product was orange in color and was readily soluble in xylene, acetone, and chloroform to give solutions which were orange colored.

*Example XI*

Twenty-five parts of the orange dye solution used in Example X were treated with 4.5 parts of a 10% solution, in 1.5% aqueous acetic acid, of a polymeric polyamine having a neutralization equivalent of 451, prepared by the reductive amination of an ethylene/carbon monoxide polymer of 8.4:1 mole ratio and of 1200 molecular weight. The product of this reaction was soluble in xylene and chloroform, but was insoluble in acetone.

*Example XII*

Three parts of the polymeric polyamine solution used in Example XI were added slowly with stirring to 25 parts of a 0.5% aqueous solution of the sodium salt of 4-para-sulfobenzene-azo-1-ortho, meta - dichloro - para - disulfophenyl - 3-methyl-5-hydroxy-pyrazol. A bright yellow precipitate was formed which was filtered, washed, and dried. The material had the characteristics of a pigment, as it was insoluble in organic solvents, e. g., xylene, acetone, and chloroform.

*Example XIII*

Paper sheets were impregnated with the yellow dye solution described in Example XII, and were dried. The dried sheets were immersed in a 2% solution, in 0.3% aqueous acetic acid, of the polyamine used in Example XI. Excess liquid was pressed from the paper sheets which were then dried. Paper thus treated was fast to leaching with water, while paper treated with the acid dye solution, but not the polyamine, showed immediate loss of color upon immersion in water.

*Example XIV*

Three parts of the polyamine described hereinafter were dissolved in 3 parts of glacial acetic acid, and the solution thus obtained was then diluted with water to 100 parts. Undyed cotton sateen was padded with the resulting solution. The treated sateen was allowed to air-dry, and was then heated for 10 minutes at 135° C. The initial spray-rating of the treated sateen was found to be 70. After laundering three times, the spray-rating was found to be unchanged. The spray-rating values were determined by the method described in the Year Book of the American Association of Textiles Chemists and Colorists 23, 240–4 (1946).

The polymeric polyamine used in the preceding experiment was prepared by the reductive amination of an ethylene/carbon monoxide polymer having a molecular weight of 3500 and an ethylene:carbon monoxide mole ratio of 11.3:1.

The polymeric polyamine contained 2.9% total nitrogen and 1.9% primary amino nitrogen.

Example XV

One part of a polymeric polyamine having a neutral equivalent of 334 and a molecular weight of 600, 5 parts of water, and 1 part of 85% phosphoric acid were stirred together until solution was complete. Strips of porous paper were impregnated with the resulting solution. The impregnated paper was allowed to air-dry. The impregnated paper was found to be fire-resistant.

Example XVI

A benzene solution of 0.05 equivalent of a polymeric polyamine, having a neutral equivalent of 515, and 0.06 mole of 12 N hydrochloric acid were mixed and the mixed solution was then evaporated to dryness. The polyamine hydrochloride obtained was a reddish, gummy solid which by analysis was found to contain 6.48% chlorine. The calculated value is 6.32% chlorine.

Example XVII

Benzene solutions of equivalent quantities of 2 parts of a polymeric polyamine, having a neutralization equivalent of 450 and 1 part of picric acid were mixed. The polyamine picrate which precipitated was dried to an orange colored, tacky solid, which by analysis was found to contain 8.03% nitrogen. The calculated value is 8.25% nitrogen.

Example XVIII

Nine parts (0.02 equivalents) of a polymeric polyamine, having a neutralization equivalent of 450, dissolved in benzene and 1 part (0.02 equivalents) of concentrated sulfuric acid were mixed. The polyamine sulfate formed precipitated as a gelatinous mass which was dried to a reddish, rubbery solid. Analysis of the product showed it to contain 7.75% sulfur. The calculated value is 6.40% sulfur.

Example XIX

A dispersion was prepared by grinding the following composition in a ball-mill:

| | Parts |
|---|---|
| Antimony trioxide ($Sb_2O_3$) | 50 |
| Chlorinated paraffin wax (70% chlorine) | 20 |
| 10% solution of polymeric polyamine resin (obtained by reductively aminating an ethylene/carbon monoxide polymer) in 1% acetic acid, said resin containing 3.44% total nitrogen, 2.71% amino nitrogen and having a molecular weight of 1780 | 130 |
| Total | 200 |

After grinding, the dispersion was diluted with 100 parts of water.

Six inch by twelve inch samples of desized 9 oz. cotton fabric were conditioned at 60% relative humidity and 70° F., and impregnated with the dispersion prepared as described above. The treated samples were allowed to dry at room temperature, sprayed with 1% aqueous formaldehyde solution, and then baked for 15 minutes at 115° C. After conditioning at 60% relative humidity and 70° F. the treated samples were tested for flame proofness by insertion in the flame of a Bunsen burner. The treated samples were found to show no after-flame upon removal from the flame. Laundering seemed to have no appreciable effect on flame-proofness.

In a control experiment using polyvinyl alcohol as the dispersing agent, instead of the polyamine, good flame-proofing was obtained initially but the flame-proofing action was lost upon laundering.

In place of the chlorinated paraffin wax of the example there can be used other chlorine containing materials, e. g., chlorinated polythene, etc.

Suitable acids for use in the preparation of the polymeric polyamine salts of this invention are such organic acids as acetic, propionic, formic, butyric, decanoic, dodecanoic, stearic, succinic, glutaric, adipic, suberic, sebacic, glycollic, malic, lactic, tartaric, citric, phthalic, naphthoic, benzoic, picric, carbolic, and the like. Examples of inorganic acids are hydrochloric, sulfuric, sulfamic, hydrocyanic, boric, sulfonic, phosphoric, hypophosphorous, carbonic, etc.

Examples of suitable acid dyestuffs are the sodium salts of 5-sulfo-3-nitro-2-hydroxybenzene - azo - beta - naphthol, sulfo - 2 - hydroxy - 5 - methylbenzene - azo - beta - naphthol, 4 - sulfo - 1 - hydroxybenzene - 2,6 - diazo - bis - beta - naphthol, 4 - ortho - sulfo - para - tolylamino - 1 - anthra - N - methylpyridone, para-sulfobenzene - azo - alpha - naphthalene - azo - 8 - amino - 1 - naphthol - 3,6 - disulfonic acid, dibenzyldiethyl - di - amino - triphenylcarbinol - disulfonic acid anhydride, 4 - sulfo - alpha - naphthalene - azo - beta - naphthol - 8 - sulfonic acid, bis - 4 - sulfo - alpha - naphthalene - disazo - resorcinol, 1,4 - di - ortho - sulfo - para - tolylamino - anthraquinone, 4 - para-sulfobenzene - azo - 1 - ortho, meta - dichloro - para - sulfophenyl - 3 - methyl - 5 - hydroxypyrazol, 4 - sulfo - alpha - naphthalene - azo - beta - naphthol - 6,8 - disulfonic acid, 4 - benzene - azo - 1 - para - sulfobenzene - 3 - methyl - 5 - hydroxypyrazol, 2,2' - disulfo - stilbene - 4,4' - disazo - bis - phenetole, 2,4 - dinitro - alpha - naphthol-7-sulfonic acid and the like.

The monoolefin/carbon monoxide polymers reductively aminated to the polymeric polyamines used in this invention to produce the new polymeric polyamine salts are formed by polymerizing a monoolefin containing up to four carbon atoms, such as ethylene, propylene, isobutylene or a plurality of said monoolefins, with carbon monoxide in the presence of a polymerization catalyst, for example, a peroxy compound as disclosed in the application of M. M. Brubaker, Serial No. 552,374, filed September 1, 1944, now abandoned, of which Patent No. 2,495,286, issued January 24, 1950, is a continuation-in-part.

The monoolefin/carbon monoxide polymers contain the carbonyl carbon in the chain of contiguous carbon atoms comprising the polymer chain. After the reduction amination of the monoolefin/carbon monoxide polymer, the oxygen of the carbonyl groups is replaced by an amino nitrogen group. Thus the polymeric polyamines have a main carbon chain and amino nitrogen groups as lateral substituents with the nitrogen thereof directly attached to a carbon atom which is an integral part of said main carbon chain. The polymeric polyamine may also contain carbonyl carbon in the chain of contiguous carbon atoms comprising the main carbon chain of said polyamine.

The polymeric polyamines from which the salt of this invention are made are at least 1,4-polyamines as shown by the formula below:

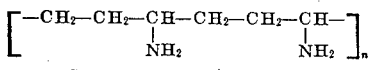

Structural Unit of Polyamine

The polymeric polyamine salts of this invention are useful as dispersing agents, as fabric treating agents, as components of fabric treating finishes to impart water-repellence or shrinkproofness or both, as pigment binders, as components of drilling muds, as components of flame-proofing compositions for textiles, as organic solvent soluble dyestuffs for coloring plastics, textiles, paper, leather, etc., as organic pigments, etc.

As many apparently widely different embodiments of this invention may be made without departing from the spirit and scope thereof, it is to be understood that this invention is not limited to the specific embodiments thereof except as defined in the appended claims.

I claim:

1. An aqueous composition containing formaldehyde and a salt of a polymeric polyamine, said polymeric polyamine being the product obtained by the reductive amination of a polymer of a monoolefin containing from 2 to 4 carbon atoms with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

2. An aqueous composition containing formaldehyde and a salt of a polymeric polyamine as set forth in claim 1, wherein said salt is an organic acid salt of said polymeric polyamine.

3. An aqueous composition containing formaldehyde and a salt of a polymeric polyamine, said polymeric polyamine being the product obtained by the reductive amination of a polymer of ethylene with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

4. An aqueous composition containing formaldehyde and a salt of a polymeric polyamine as set forth in claim 3, wherein said salt is an organic acid salt of said polymeric polyamine.

5. An aqueous composition containing formaldehyde and a salt of a polymeric polyamine as set forth in claim 3, wherein said salt is a saturated aliphatic monocarboxylic acid salt of said polymeric polyamine.

6. An aqueous composition containing formaldehyde and a salt of a polymeric polyamine as set forth in claim 3, wherein said salt is an inorganic acid salt of said polymeric polyamine.

7. An aqueous composition containing formaldehyde and a polymeric polyamine acetate salt, said polymeric polyamine being the product obtained by the reductive amination of a polymer of ethylene with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

8. An aqueous composition containing formaldehyde and a salt of a polymeric polyamine as set forth in claim 1 and a pigment.

9. An aqueous composition containing formaldehyde, a pigment and a salt of a polymeric polyamine, said polymeric polyamine being the product obtained by the reductive amination of a polymer of a monoolefin containing from 2 to 4 carbon atoms with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

10. A composition containing formaldehyde, a pigment and a salt of a polymeric polyamine, said polymeric polyamine being the product obtained by the reductive amination of a polymer of a monoolefin containing from 2 to 4 carbon atoms with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

MARTIN E. CUPERY.

REFERENCES CITED

The following references are of record in the file of this patent:

UNITED STATES PATENTS

| Number | Name | Date |
|---|---|---|
| 2,063,158 | Greenewalt | Dec. 8, 1936 |
| 2,122,707 | Balthis | July 5, 1938 |
| 2,457,271 | Pinkney | Dec. 28, 1948 |
| 2,495,255 | Hoehn | Jan. 24, 1950 |